(12) United States Patent
Nakayama (10) Patent No.: US 11,184,530 B2
(45) Date of Patent: Nov. 23, 2021

(54) DRIVE SUBSTRATE FOR CAMERA AND BROADCAST CAMERA

(71) Applicant: HITACHI KOKUSAI ELECTRIC INC., Tokyo (JP)

(72) Inventor: Yosuke Nakayama, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/268,724

(22) PCT Filed: Aug. 23, 2019

(86) PCT No.: PCT/JP2019/033002
§ 371 (c)(1),
(2) Date: Feb. 16, 2021

(87) PCT Pub. No.: WO2020/054359
PCT Pub. Date: Mar. 19, 2020

(65) Prior Publication Data
US 2021/0320663 A1   Oct. 14, 2021

(30) Foreign Application Priority Data
Sep. 12, 2018   (JP) .............................. JP2018-170284

(51) Int. Cl.
*H04N 5/232*   (2006.01)
*H04N 5/376*   (2011.01)
*G11B 20/10*   (2006.01)

(52) U.S. Cl.
CPC ... *H04N 5/23227* (2018.08); *G11B 20/10222* (2013.01); *G11B 20/10268* (2013.01); *H04N 5/3765* (2013.01)

(58) Field of Classification Search
CPC ............. H04N 5/23227; H04N 5/3765; G11B 20/10222; G11B 20/10268
See application file for complete search history.

(56) References Cited

U.S. PATENT DOCUMENTS 1,614,522 A * 1/1927 Clark ...................... B31B 50/00
493/76
3,546,588 A * 12/1970 Campbell, Jr. ........ H04B 3/462
375/226

(Continued)

FOREIGN PATENT DOCUMENTS

| JP | 2007-194963 A | 8/2007 |
| JP | 2010-219638 A | 9/2010 |

(Continued)

OTHER PUBLICATIONS

International Search Report cited in International Appln. PCT/JP2019/033002 dated Nov. 12, 2019.

*Primary Examiner* — Antoinette T Spinks
(74) *Attorney, Agent, or Firm* — Bacon & Thomas, PLLC (57) ABSTRACT

A drive substrate for a camera and a broadcast camera which are free from the occurrence of bit errors in video over a low to high temperature range while achieving reduction in a production cost and development time are provided. The phase of a clock is appropriately adjusted by repeating the processes of shifting the clock phase in a first period within a blanking period during which effective pixel data of each frame in a video signal is not used, detecting the occurrence/non-occurrence of a bit error based on the phase-shifted clock in a second period within the blanking period, and further shifting the clock phase in a third period within the blanking period.

8 Claims, 9 Drawing Sheets

(56) References Cited

U.S. PATENT DOCUMENTS

| | | | | |
|---|---|---|---|---|
| 6,268,889 | B1* | 7/2001 | Koori | H04N 5/913 |
| | | | | 348/642 |
| 9,917,607 | B1* | 3/2018 | Zhang | H03G 3/3078 |
| 10,554,963 | B1* | 2/2020 | Hook | H04L 1/206 |
| 10,972,720 | B2* | 4/2021 | Hook | H04N 21/23602 |
| 2004/0041944 | A1* | 3/2004 | Matsumoto | H04N 7/0355 |
| | | | | 348/465 |
| 2009/0044087 | A1* | 2/2009 | Chen | H04L 1/0045 |
| | | | | 714/800 |
| 2009/0175325 | A1* | 7/2009 | Soma | H04L 1/205 |
| | | | | 375/226 |
| 2009/0213265 | A1* | 8/2009 | Yamashita | H04N 5/268 |
| | | | | 348/500 |
| 2010/0039156 | A1 | 2/2010 | Yamaguchi | |
| 2012/0320175 | A1 | 12/2012 | Takizawa et al. | |
| 2020/0228794 | A1* | 7/2020 | Hook | H04N 21/6587 |

FOREIGN PATENT DOCUMENTS

| | | |
|---|---|---|
| JP | 2011-223391 A | 11/2011 |
| JP | 2013-000450 A | 1/2013 |
| JP | 2013-165369 A | 8/2013 |
| WO | WO2008/111395 | 9/2008 |

* cited by examiner

| VIDEO PERIOD | VERTICAL COUNTER | REFERENCE |
|---|---|---|
| V.FRONT (2 LINE) | 0 | SOF, SOL, EOL NON-DETECTABLE AREA |
| | 1 | |
| DISABLED AREA (20 LINE) | 2 | DISABLED BECAUSE SOF SHOWS UP THIS LINE (MAINTAIN PHASE IN WHICH BIT ERROR DOES NOT OCCUR) |
| | 3 | PHASE SHIFT AREA (1) |
| | 4 | SOL, EOL DETECTING AREA (18 LINE) SOL AND EOL ARE DETECTED 36 TIMES WHEN THERE IS NO BIT ERROR |
| | 20 | |
| | 21 | |
| EFFECTIVE PIXEL AREA (1100 LINE) | 22 | PHASE SHIFT AREA (2) SHIFT PHASE IN WHICH BIT ERROR DOES NOT OCCUR |
| | 23 | |
| | 24 | |
| | 1120 | |
| | 1121 | |
| V.BACK (4 LINE) | 1122 | SOF, SOL, EOL NON-DETECTABLE AREA TOP FIELD : 1126 LINE (BOTTOM FIELD: 1124 LINE) |
| | 1123 | |
| | 1125 | |

| STAGE | PHASE UP DOWN | NUMBER OF SHIFT AREA (1) | NUMBER OF SHIFT AREA (2) | REFERENCE | |
|---|---|---|---|---|---|
| 0 | DOWN | - | 1 | 00010 | 2 |
| 0_5 | DOWN | - | - | 00000 | 0 |
| 1 | DOWN | 4 | - | 01100 | 12 |
| 2 | UP | 1 | 4 | 11011 | 27 |
| 3 | UP | 4 | 4 | 11111 | 31 |
| 4 | DOWN | 1 | 4 | 01011 | 11 |
| 5 | UP | 4 | - | 11100 | 28 |
| 6 | DOWN | - | 4 | 00011 | 3 |
| 7 | DOWN | - | - | 00000 | 0 |
| ERROR_Flg | DOWN | - | 4 | 00011 | 3 |

FIG.9

| BIT | CONTENTS OF STAGE | |
|---|---|---|
| 1(LSB) | NUMBER OF SHIFT OF AREA (2) | 1 = 4 STEP 0 = 1 STEP |
| 2 | NUMBER OF SHIFT OF AREA (2) | 1 = ENABLE |
| 3 | NUMBER OF SHIFT OF AREA (1) | 1 = 4 STEP 0 = 1 STEP |
| 4 | AREA (1) ENABLE | 1 = ENABLE |
| 5(MSB) | PHASE UP DOWN | 1 = UP 0 = DOWN |

| NUMBER OF STEP | | 35 | 36 | 37 | 38 | 39 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|
| DETERMINATION | HIGH TEMP | X | O | O | O | O | O | ◉ | X | X | X | X | X | X | X | X | X | X | X | X | X | X | X | X | X | X | X | X |
| | ROOM TEMP | X | X | X | X | X | X | X | X | O | O | O | O | O | O | ◉ | X | X | X | X | X | X | X | X | X | X | X | X |
| | LOW TEMP | X | X | X | X | X | X | X | X | X | X | X | X | O | O | O | O | O | O | O | O | ◉ | O | O | O | O | O | X |

CLOCK PHASE

OK RANGE WHEN HIGH TEMPERATURE

OK RANGE WHEN ROOM TEMPERATURE

OK RANGE WHEN LOW TEMPERATURE

DRIVE SUBSTRATE FOR CAMERA AND BROADCAST CAMERA

TECHNICAL FIELD

The present disclosure relates to a drive substrate for a high-speed camera that operates with a high-speed clock, and more particularly, to a drive substrate for a camera and a broadcast camera that are free from occurrence of bit errors in video over a low to high temperature range while achieving reduction in production cost and development time.

BACKGROUND

Prior Art

A drive substrate for a camera has a field programmable gate array (FPGA), and reads a video signal (video data) from a sensor substrate having a red (R) image pickup sensor, a green (G) image pickup sensor, and a blue (B) image pickup sensor for a camera to perform signal processing.

Figure 10:
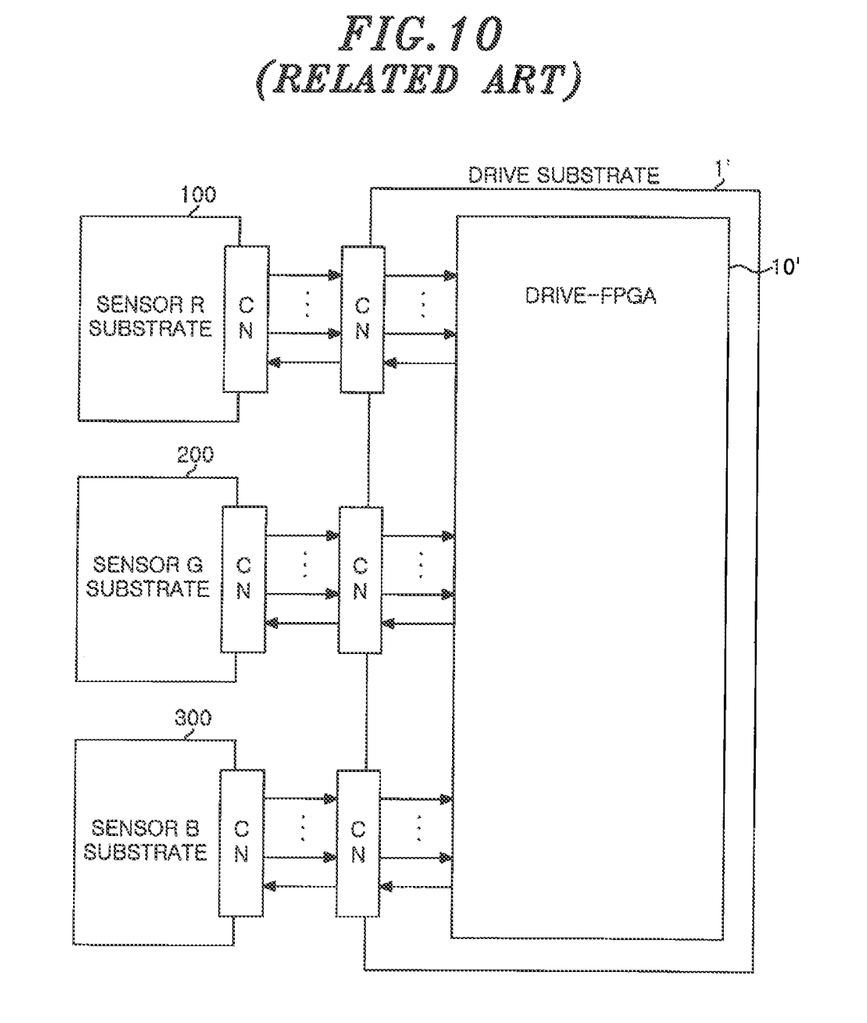
FIG. 10 schematically shows a conventional sensor substrate and a conventional drive substrate.

(Conventional Sensor Substrate and Drive Substrate: FIG. 10)

The relationship between a conventional sensor substrate and a conventional drive substrate will be described with reference to FIG. 10. FIG. 10 schematically shows the conventional sensor substrate and the conventional drive substrate.

The sensor substrate for a camera includes a sensor R substrate 100 for red (R), a sensor G substrate 200 for green (G), and a sensor B substrate 300 for blue (B).

Each sensor substrate has a connector CN and is connected to a drive substrate 1'.

Further, a Drive-FPGA 10' is mounted on the drive substrate 1'.

The drive substrate 1' has a connector CN to be connected to the connector CN of the sensor substrate, and is configured to introduce data from the sensor substrate into the Drive-FPGA 10'.

R, G, B data and a clock are inputted to the drive substrate 1' and outputted to the Drive-FPGA 10'. In the Drive-FPGA 10', the R, G, B data are driven by the inputted clock at the same time.

Further, the Drive-FPGA 10' generates a main clock MCLK for driving and provides the main clock MCLK to the sensor R substrate 100 so that a first clock and a second clock can be generated using the main clock MCLK.

Although the drive substrate for driving a sensor substrate of a conventional high definition (HD) camera has been used for a high-speed camera (slow motion camera), it was required to use a high-speed clock that is twice faster than that used in a normal camera.

Figure 11:
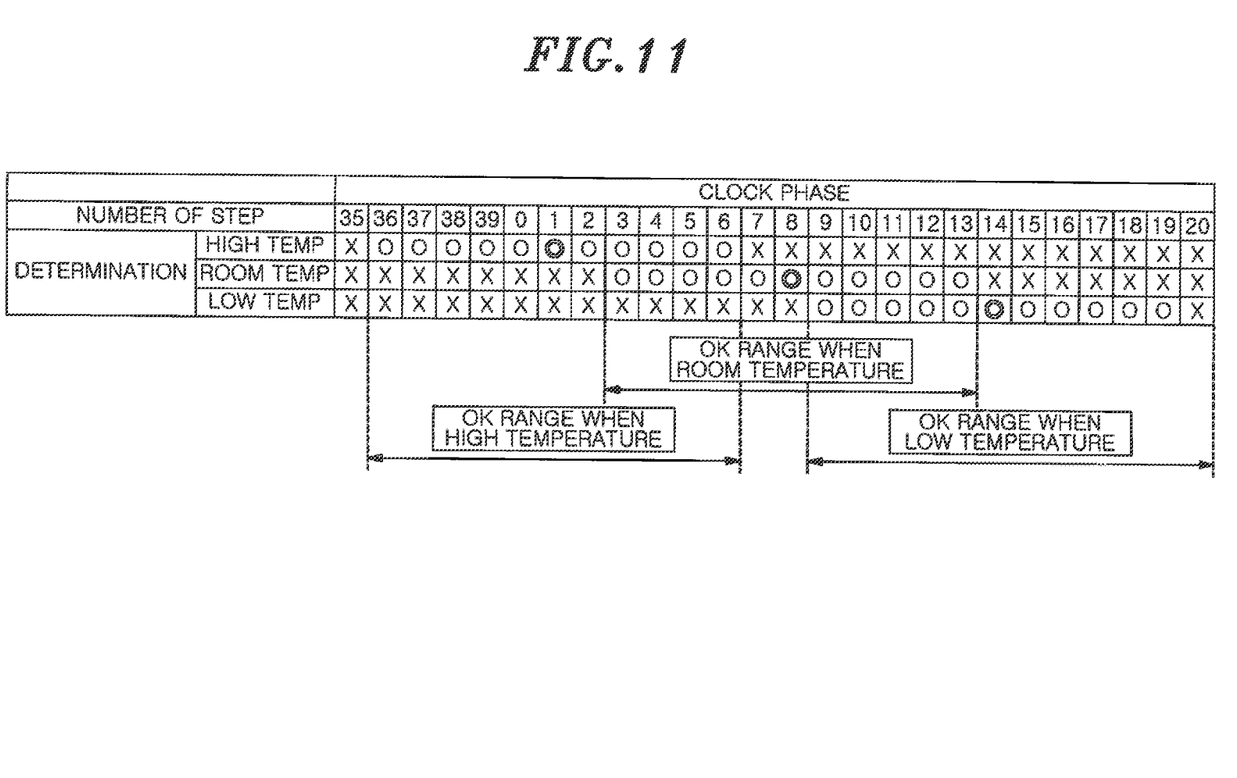
FIG. 11 shows a change in a clock phase due to a temperature change.

(Change in Clock Phase Due to Temperature Change: FIG. 11)

Here, a change in a clock phase due to a temperature change in the case of using the conventional drive substrate for the high-speed camera will be described with reference to FIG. 11. FIG. 11 shows the change in the clock phase due to the temperature change.

A clock generated by phase locked loop (PLL) in the Drive-FPGA 10' can be latched by shifting the phase in 40 steps per cycle by a dynamic phase shift function of the PLL. Steps where bit errors do not occur are indicated by "○"; steps where bit errors occur are indicated by "X"; and a median is indicated by "⊙".

In the high-speed camera, a transmission rate between the sensor substrate and the drive substrate is high and the clock generated by the PLL has a high speed. Therefore, if the clock phase is not correct, a setup/hold violation occurs at compile time and bit errors occur.

Whether or not the bit errors occur depends on a temperature.

As shown in FIG. 11, at a room temperature, no bit error occurs when the clock phase is in step 3 to 13 (median is step 8) (○ state), whereas bit errors occur in the other steps (X state).

At a high temperature, no bit error occurs when the clock phase is in step 36 to 6 (median is step 1) (○ state), whereas bit errors occur in the other steps (X state).

At a low temperature, no bit error occurs when the clock phase is in steps 9 to 19 (median is step 14) (○ state), whereas bit errors occur in the other steps (X state).

As described above, in the case of using the clock phase steps 3 to 13 (median is step 8) within the range where the bit errors do not occur at the room temperature, the bit errors occur at the high temperature and the low temperature.

Related Arts

Related prior arts include "Data transfer device and imaging device" (Patent Document 1) disclosed in Japanese Patent Application Publication No. 2010-219638, "Phase adjusting device and imaging device" (Patent Document 2) disclosed in Japanese Patent Application Publication No. 2013-165369, "Clockless transmission system and clockless transmission method" (Patent Document 3) disclosed in International Publication No. 2008/111395, and "Electronic endoscope device" (Patent Document 4) disclosed in Japanese Patent Application Publication No. 2013-000450.

Patent Document 1: Japanese Patent Application Publication No. 2010-219638
Patent Document 2: Japanese Patent Application Publication No. 2013-165369
Patent Document 3: International Publication No. 2008/111395
Patent Document 4: Japanese Patent Application Publication No. 2013-000450

In the case of using the conventional drive substrate for a camera, as described above, the high-speed clock is used for a high-speed camera and, thus, there is no problem at a room temperature. However, bit errors occur in video at a low temperature and at a high temperature.

In addition, there is no problem when a high-performance and a high-function FPGA is mounted on the drive substrate for a high-speed camera. However, the substrate needs to be improved and redesigned, so that the cost increases.

Patent Documents 1 to 4 do not disclose that a clock phase is shifted depending on a temperature during a blanking period for each frame of a video signal and set to avoid occurrence of bit errors.

In view of the above, the object of the present invention is to provide a drive substrate for a camera and a broadcast camera that are free from occurrence of bit errors in video over a low to high temperature range while achieving reduction in a production cost and development time.

SUMMARY

In order to solve the problem, the present invention provides a drive substrate for a camera that receives video data from a sensor substrate and performs signal processing, comprising: a PLL circuit configured to shift a phase of a clock; and a phase shift control unit configured to control the PLL circuit to shift the phase of the clock in a first period within a blanking period during which effective pixel data of a frame in the video data is not used and to detect whether or not bit errors occur in the phase-shifted clock in a second period within the blanking period.

The present invention provides that when the bit errors occur in the second period, the phase shift control unit controls the PLL circuit to shift the phase of the clock in a third period within the blanking period and adjusts the phase of the clock by repeating the processes from the first period to the third period for each frame.

The present invention provides that the phase shift control unit counts a line start code and a line end code for multiple lines in the second period, and detects an occurrence of the bit errors when the count value is smaller than a predetermined set value.

The present invention provides that a broadcast camera comprises the drive substrate for the camera.

The present invention provides a clock phase control method for a drive substrate for a camera, comprising: causing a PLL circuit to shift a phase of a clock in a first period within a blanking period during which effective pixel data of a frame in video data is not used; detecting whether or not bit errors occur in the phase-shifted clock in a second period within the blanking period; causing the PLL circuit to shift the phase of the clock in a third period within the blanking period when the bit errors occur in the second period; and adjusting the phase of the clock by repeating the processes from the first period to the third period for each frame.

Effect of the Invention

In accordance with the present invention, the drive substrate for a camera includes the PLL circuit configured to shift the phase of the clock, and the phase shift control unit configured to control the PLL circuit to shift the phase of the clock in the first period within the blanking period during which effective pixel data of each frame in a video signal is not used and detecting occurrence/non-occurrence of bit errors based on the phase-shifted clock in the second period within the blanking period. Accordingly, it is possible to prevent the occurrence of bit errors in video over a low to high temperature range while achieving reduction in a production cost and development time.

DETAILED DESCRIPTION

Embodiments of the present invention will be described with reference to the drawings.

Outline of Embodiments

In a drive substrate for a camera (the drive substrate) according to an embodiment of the present invention, a clock phase is shifted in a first period within a blanking period during which an effective pixel of each frame in a video signal is not used. The occurrence/non-occurrence of bit errors is detected based on the phase-shifted clock in a second period within the blanking period. The clock phase is further shifted in a third period within the blanking period, and these processes are repeated to appropriately adjust the clock phase. Accordingly, it is possible to achieve reduction in a production coat and development time and to prevent occurrence of bit errors over a low to high temperature range.

A broadcast camera according to an embodiment of the present invention includes the drive substrate.

Figure 1:
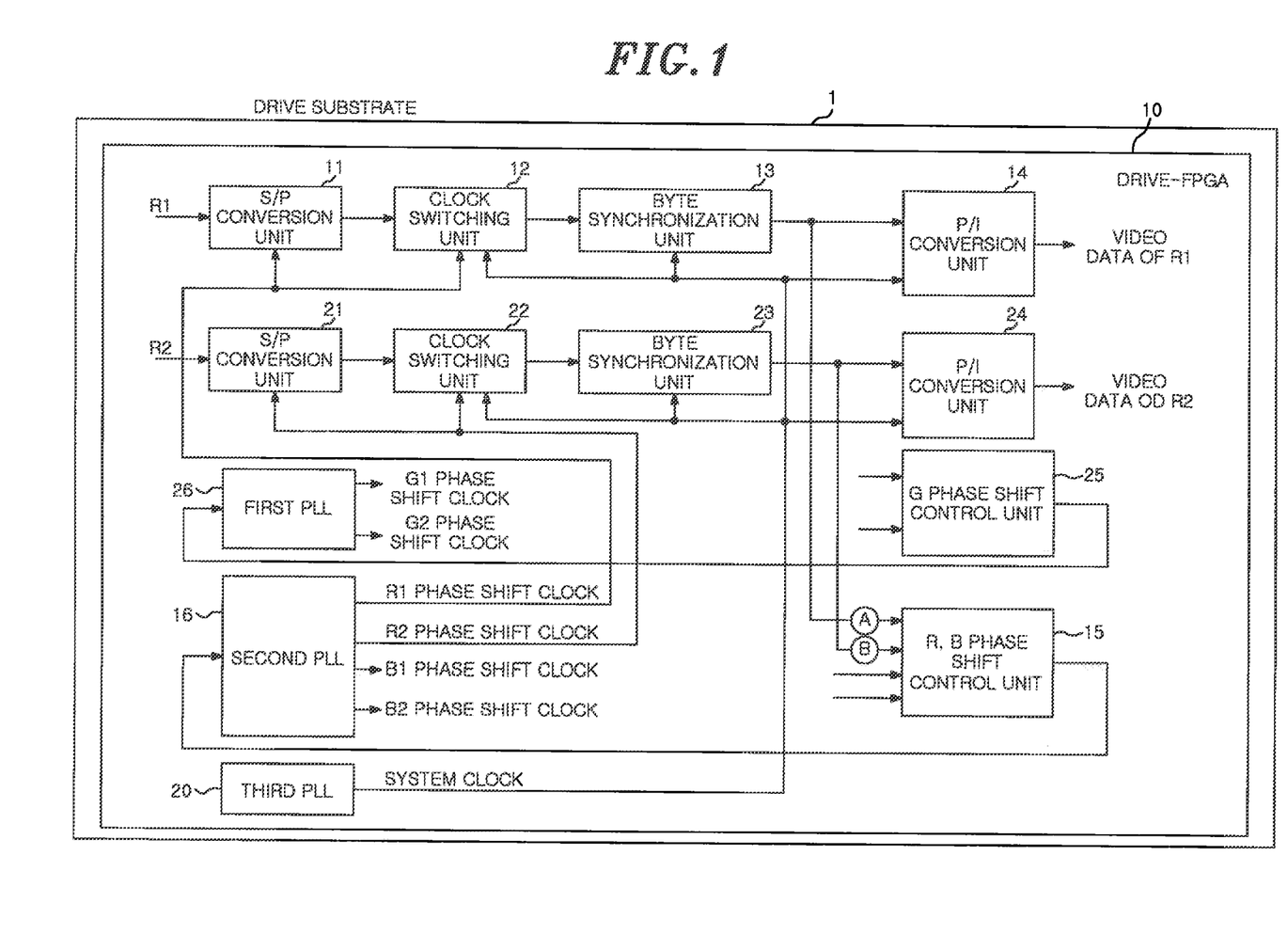
FIG. 1 schematically shows a drive FPGA of a drive substrate.

(Drive FPGA of the Drive Substrate: FIG. 1)

The drive FPGA of the drive substrate will be described with reference to FIG. 1. FIG. 1 schematically shows a drive FPGA of the drive substrate.

As shown in FIG. 1, the drive substrate 1 includes a drive FPGA 10.

The relationship between the drive substrate 1 and the sensor R substrate 100, the sensor G substrate 200, and the sensor B substrate 300 is the same as that shown in FIG. 10 except that the drive FPGA 10 uses an internally generated clock whose phase is shifted without using a clock CLK transmitted from each sensor substrate together with video data.

In FIG. 1, the configuration for processing red (R) video data is mainly described, and the configuration for processing green (G) video data and blue (B) video data is omitted.

As shown in FIG. 1, the drive FPGA 10 includes serial/parallel (S/P) conversion units 11 and 21, clock switching units 12 and 22, byte synchronization units 13 and 23, progressive/interlace (P/i) conversion units 14 and 24, a R, B phase shift control unit 15, a G phase shift control unit 25, a first PLL circuit 26, a second PLL circuit 16, and a third PLL circuit 20.

Briefly, the drive FPGA 10 operates to find and set an appropriate clock phase by repeating a process of shifting the phase of the clock in the blanking period within a frame of a video data, the data in the blanking period is not used as video data, and determining whether or not bit errors occur in the shifted phase.

(Units of Drive—FPGA 10)
(S/P Conversion Unit 11)
The S/P conversion unit 11 receives a first red video data R1, converts serial data into parallel data based on an R1 phase shift clock for the first red video data R1 from the second PLL circuit 16, and outputs the parallel data to the clock switching unit 12.

(S/P Conversion Unit 21)
The S/P conversion unit 21 receives a second red video data R2, converts serial data into parallel data based on an R2 phase shift clock for the second red video data R2 from the second PLL circuit 16, and outputs the parallel data to the clock switching unit 22.

(Clock Switching Unit 12)

The clock switching unit 12 writes the data from the S/P conversion unit 11 to a memory such as an internal random access memory (RAM) based on the R1 phase shift clock of the second PLL circuit 16, reads out data based on a system clock from the third PLL circuit 20, and outputs the data to the byte synchronization unit 13. In other words, switching to the system clock is performed by the clock switching unit 12.

(Clock Switching Unit 22)

The clock switching unit 22 writes the data from the S/P conversion unit 21 to a memory such as an internal RAM based on the R2 phase shift clock of the second PLL circuit 16, reads out data based on the system clock from the third PLL circuit 20, and outputs the data to the byte synchronization unit 23. In other words, switching to the system clock is performed by the clock switching unit 22.

(Byte Synchronization Unit 13)

The byte synchronization unit 13 receives the system clock from the third PLL circuit 20, performs byte synchronization on R1, and outputs the byte-synchronized data R1 and an sof (start of frame: frame start code) signal, a sol (start of line: line start code) signal, and an eol (end of line: line end code) signal of a video data frame to the p/i conversion unit 14. The line is a horizontal line of a frame.

Further, the byte synchronization unit 13 outputs the sof, sol, and eol signals for R1 to the R, B phase shift control unit 15.

(Byte Synchronization Unit 23)

The byte synchronization unit 23 receives the system clock from the third PLL circuit 20, performs byte synchronization on R2, and outputs the byte-synchronized data R2 and the sof, sol, and eol signals to the p/i conversion unit 24.

Further, the byte synchronization unit 23 outputs the sof, sol, and eol signals for R2 to the R, B phase shift control unit 15.

(P/i Conversion Unit 14)

The p/i conversion unit 14 receives the system clock from the third PLL circuit 20, converts the byte-synchronized data R1 obtained by the byte synchronization unit 13 from progressive data to interlace data, and outputs the converted data.

(P/i Conversion Unit 24)

The p/i conversion unit 24 receives the system clock from the third PLL circuit 20, converts the byte-synchronized data R2 obtained by the byte synchronization unit 23 from progressive data to interlace data, and outputs the converted data.

The S/P conversion units 11 and 21, the clock switching units 12 and 22, the byte synchronization units 13 and 23, and the p/i conversion units 14 and 24 have the same configurations for green video data and blue video data. However, such configurations are omitted in FIG. 1.

(R, B Phase Shift Control Unit 15)

The R, B phase shift control unit 15 receives sof, sol, and eol signals of R1 from the byte synchronization unit 13, receives sof, sol, and eol signals of R2 from the byte synchronization unit 23, receives sof, sol, and eol signals of first blue video data B1 and sof, sol, eol signals of second blue video data B2, detects a blanking period, and outputs phase shift control information (R, Bch phase shift control signal) for adjusting the clock phase for R1, R2, B1 and B2 to the second PLL circuit 16.

The R, B phase shift control unit 15 includes a sol and eol detection/calculation circuit that will be described later, and a processing control unit for performing phase shift processing. The configurations thereof and internal processing will be described later.

(G Phase Shift Control Unit 25)

The G phase shift control unit 25 receives the sof, sol, and eol signals of the byte-synchronized first green video data G1 and the sof, sol, and eol signals of the byte-synchronized second video data G2 and outputs the phase shift control information (Gch phase control signal) for G1 and G2 to the first PLL circuit 26.

The processing in the R, B phase shift control unit 15 and the G phase shift control unit 25, which is the feature of the present embodiment, will be described in detail later.

(First PLL Circuit 26)

The first PLL circuit 26 generates and outputs a clock (G1 phase shift clock) whose phase is shifted for the first green image data G1 and a clock (G2 phase shift clock) whose phase is shifted for the second green video data G2 based on the phase shift control information (control information of G1 and G2) from the G phase shift control unit 25.

The first PLL circuit 26 and the second PLL circuit 16 can shift the phase of the generated clock in 40 steps per cycle. Due to this function (Dynamic Phase Shift function), it is possible to shift the phase of the output clock of the PLL circuit and latch the video data based on the shifted clock phase to the S/P conversion units 11 and 21 and the like.

(Second PLL Circuit 16)

The second PLL circuit 16 generates and outputs a clock (R1 phase shift clock) whose phase is shifted for the first red video data R1, a clock (R2 phase shift clock) whose phase is shifted for the second red video data R2, a clock (B1 phase shift clock) whose phase is shifted for the first blue video data B1, and a clock (B2 phase shift clock) whose phase is shifted for the second blue video data B2 based on the phase shift control information (control information of R1, R2, B1, and B2) from the R, B phase shift control unit 15.

The R1 phase shift clock is inputted to the S/P conversion unit 11 and the clock switching unit 12. The S/P conversion unit 11 performs S/P conversion in accordance with the timing of the R1 phase shift clock. In the clock switching unit 12, the R1 phase shift clock is used at the timing of writing data in the internal RAM.

Further, the R2 phase shift clock is inputted to the S/P conversion unit 21 and the clock switching unit 22. The S/P conversion unit 21 performs S/P conversion in accordance with the timing of the R2 phase shift clock. In the clock switching unit 22, the R2 phase shift clock is used at the timing of writing data in the internal RAM.

The phase shift clocks of other colors are also inputted to the S/P conversion units and the clock switching units of the respective colors.

(Third PLL Circuit 20)

The third PLL circuit 20 generates a system clock in the Drive-FPGA 10 based on a clock generated by a voltage control crystal oscillator (VCXO) and provides the system clock to each unit.

Figure 2:
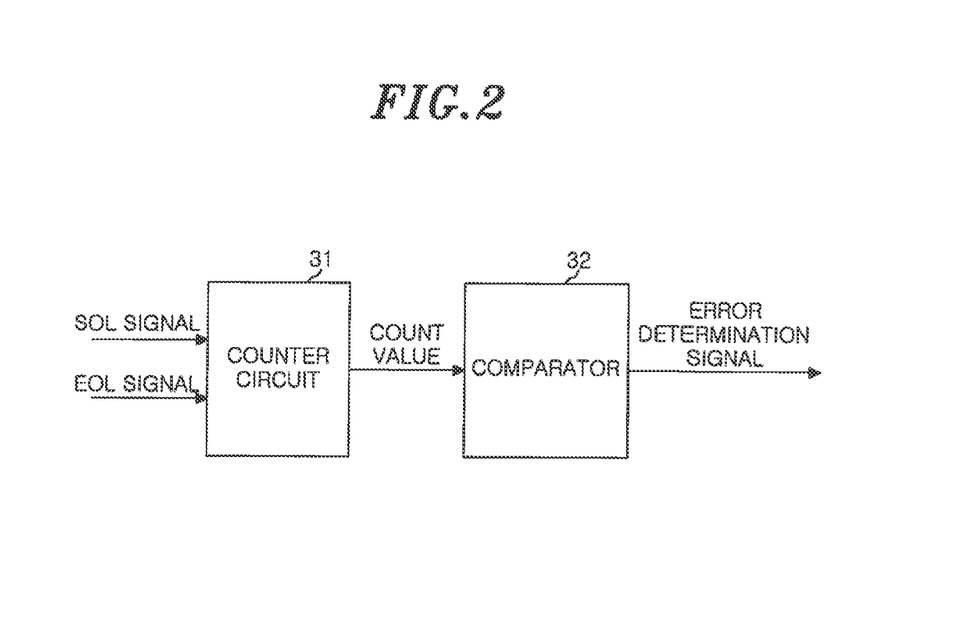
FIG. 2 is a block diagram of an error determination circuit.

(Error Determination Circuit: FIG. 2)

Next, an error determination circuit for evaluating the Drive-FPGA 10 will be described with reference to FIG. 2. FIG. 2 is a block diagram of the error determination circuit.

Since the error determination circuit is a device for evaluation, it is installed, but not mounted, at input stages A and B of R1 and R2 of the R, B phase shift control unit 15 in FIG. 1.

Further, the error determination circuit may be installed at the input stages of B1 and B2 of the R, B phase shift control unit 15 and at the input stage of the G phase shift control unit 24 to determine bit errors of other colors.

As shown in FIG. 2, the error determination circuit includes a counter circuit 31 that receives a sol signal and an eol signal and outputs a count value when these signals are detected, and a comparator 32 for comparing the count value and a normal value obtained when no error occurs.

When an error occurs, the sol signal or the eol signal is not detected, and the count value outputted from the counter circuit 31 is smaller than the normal value obtained when there is no error.

If the count value is not equal to the normal value in the comparator 32, it is determined that an error occurred and an error determination signal is outputted.

By using the error determination circuit, it is possible to determine whether or not the phase has been appropriately shifted depending on the temperature in the present embodiment.

Figure 3:
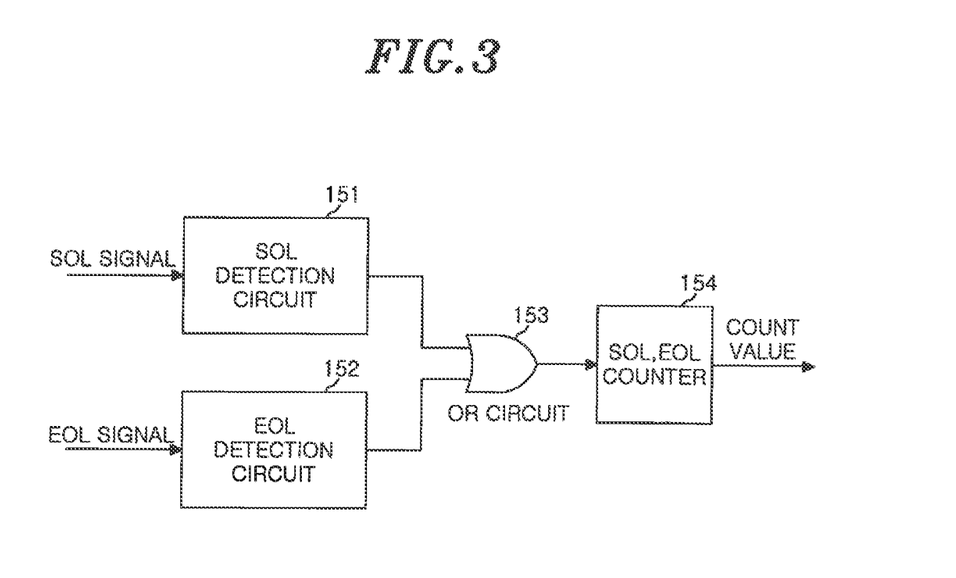
FIG. 3 is a block diagram of a sol and eol detection/calculation circuit.

(Sol and eol Detection/Calculation Circuit: FIG. 3)

Next, the sol and eol detection/calculation circuit provided in the R, B phase shift control unit 15 of the Drive-FPGA 10 will be described with reference to FIG. 3. FIG. 3 is a block diagram of the sol and eol detection/calculation circuit.

The sol and eol detection/calculation circuit detects the sol signal and the eol signal, respectively, counts the number of detections, and outputs the count value. Whether or not bit errors have occurred is determined based on whether or not the sol signal and the eol signal can be detected.

Further, the R, B phase shift control unit 15 includes a processing control unit that receives the count value from the sol and eol detection/calculation circuit and performs shift processing. The processing control unit includes a calculation unit and a storage unit and performs the processing based on a program. The phase shift processing of the processing control unit will be described later.

As shown in FIG. 3, the sol and eol detection/calculation circuits include a sol detection circuit 151 for detecting a sol signal and outputting a detection signal, an eol detection circuit 152 for detecting an eol signal and outputting a detection signal, a logical sum (OR) circuit 153 for outputting a signal for counting when there is an input of the detection signal from the sol detection circuit 151 or the detection signal from the eol detection circuit 152, and a sol and eol counter 154 for counting the number of signals from the OR circuit 153 and outputting the count value.

The count value is used determining whether or not sol and eol are counted 36 times in FIGS. 5 to 7 to be described later.

Figure 4:
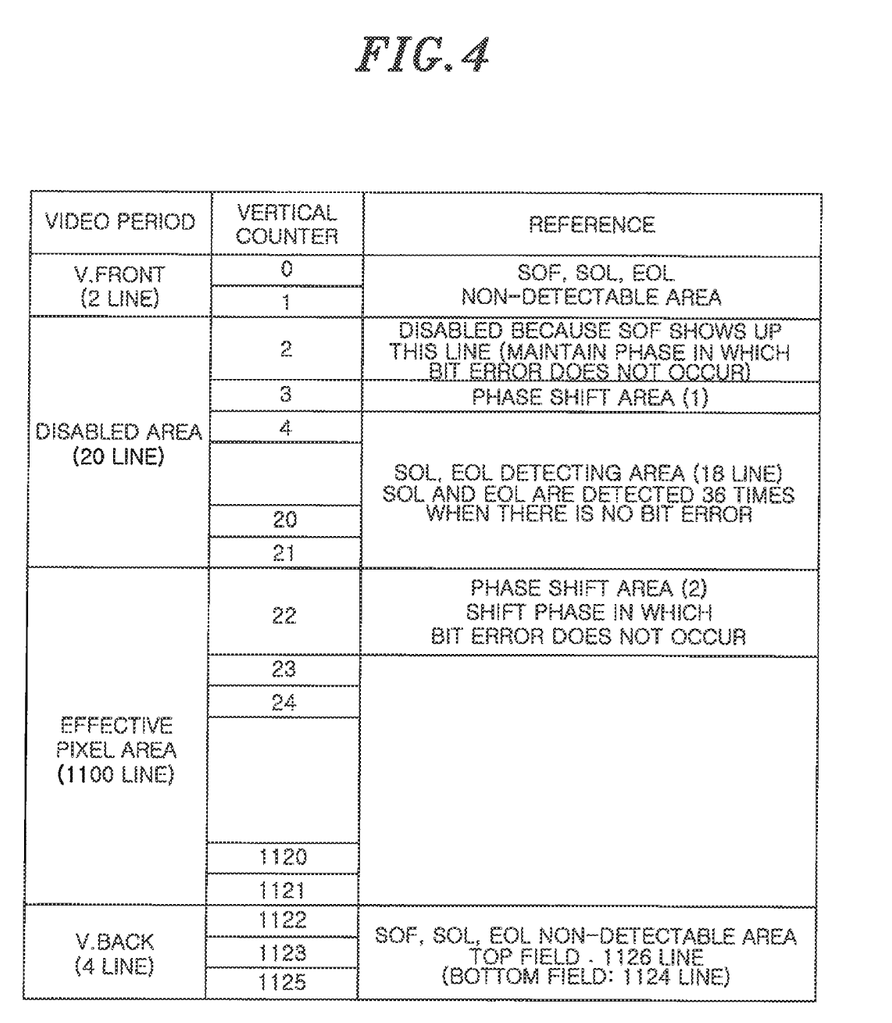
FIG. 4 shows a relationship between a video period and a vertical counter.

(Relationship Between Video Period and Vertical Counter: FIG. 4)

Next, a relationship between a video period of one frame in the video data and a vertical counter will be described with reference to FIG. 4. FIG. 4 shows the relationship between the video period and the vertical counter.

As shown in FIG. 4, in a video period of V. FRONT, vertical counters are "0" and "1" and SOF (Start Of Frame), SOL (Start Of Line), and EOL (End Of Line) codes (hereinafter, simply referred to as "SOF," "SOL," and "EOL") are non-detectable.

In a video period of disabled area, when the vertical counter is "2", SOF is detected; when the vertical counters are "4" to "21", SOL and EOL are detected. Since there are 18 lines, if SOL and EOL are counted once for each line, SOL and EOL are detected 36 times when there is no bit error. A period of the vertical counters "4" to "21" corresponds to a second period in the claims.

When the vertical counter "3", a first phase shift setting area (Phase Shift area (1)) for shifting the phase of the clock is provided. The phase shift area (1) is a period for shifting the phase of the clock in a step direction and the number of steps according to a stage to be described later. This period corresponds to a first period in the claims.

In a video period of an effective pixel area, data of an effective pixel is set for each line. However, when the vertical counter is "22", the effective pixel is not set and the area is not used. Therefore, in the present embodiment, a second phase shift setting area (Phase Shift area (2)) for shifting the phase of the clock is provided. The period of the phase shift area (2) corresponds to a third period in the claims.

A method of using the first phase shift setting area and the second phase shift setting area will be described later with reference to a flowchart.

(Outline of Phase Shift Processing)

Briefly, the phase shift processing of the present embodiment is performed to find and set an optimal clock phase for a current environment (temperature state). The phase shift processing is performed more regularly when a power of a camera is turned on.

Particularly, in the following phase shift processing, an optimal central clock phase is determined while shifting the currently set clock phase in a DOWN direction (to the right side in FIG. 11) and an UP direction (to the left side in FIG. 11).

If the phase shifting is continued in one direction, the phase circulates and eventually returns to the original state.

(Phase Shift Processing: FIGS. 5 to 7)

Next, the phase shift processing of the present embodiment will be described with reference to FIGS. 5 to 7. FIG. 5 is a flowchart of phase shift processing (1). FIG. 6 is a flowchart of phase shift processing (2). FIG. 7 is a flowchart of phase shift processing (3). FIGS. 5 to 7 show a series of processes. (A) of FIG. 5 is continued to (A) of FIG. 6, and (B) of FIG. 6 is continued to (B) of FIG. 7.

The series of the phase shift processing is performed for the red video data R1 and R2 by the R, B phase shift control unit 15. The phase shift processing of B1 and B2 is performed by the R, B phase shift control unit 15. The phase shift processing of G1 and G2 is performed by the G phase shift control unit 25. The phase shift processing may be performed by an external processing unit of these phase shift control units.

The "DOWN direction" in the drawing indicates that the clock phase of FIG. 11 is shifted (stepped) to the right side, and the "UP direction" indicates that the clock phase of FIG. 11 is shifted (stepped) to the left side.

In the processing flow, the stage is determined, and the shift direction and the number of shifts are determined depending on the stage. This will be described with reference to FIGS. 8 and 9.

(Phase Shift Processing (1): FIG. 5)

When the power of the camera is turned on, the phase shift process is started (START) in the R, B phase shift control unit 15, and it is determined whether or not "locked" of the PLL circuit (particularly, the third PLL circuit 20) and 59.94 Hz/50 Hz switching are stabilized within a stabilization period (about 7 msec in the present embodiment). In other words, it is determined whether or not there is a signal change within the stabilization period (S11), and the determination process S11 is repeated when there is a signal change without stabilization (Yes).

If there is no signal change within the stabilization period (No), it is determined whether or not SOL and EOL are detected 36 times in total in 18 lines of the vertical counters 4 to 21 (S12).

When the SOL and EOL are detected 36 times, it is determined that SOL and EOL are included twice in 18 lines, i.e., there is no bit error.

If SOL and EOL are not detected 36 times (No), the phase is shifted by 1 step in the DOWN direction while setting the number of steps "1" in the second phase shift setting area (area (2)) (S13). Then, the processing returns to the determination process 812.

If SOL and EOL are detected 36 times in the determination process S12 (Yes), it is determined whether or not there is a 9 step error in the DOWN direction for all Ch (R1, R2, G1, G2, B1, and B2) (S14). If there is an error (No), the processing proceeds to the process S13. The phase is further shifted by 1 step in the DOWN direction, and the processing returns to the determination process 812.

The determination process S14 circulates in the DOWN direction until there is no 9 step error.

If it is determined in the determination process S14 that there is no 9 step error in the DOWN direction for all Ch (Yes), it is determined whether or not SOL and EOL are detected 36 times in total in the 18 lines of the vertical counters 4 to 21 (S15). If SOL and EOL are not detected 36 times (No), the phase is shifted by four steps in the DOWN direction while setting the number of steps "4" in the area (2) (S16). Then, error processing is performed (S17), and the processing proceeds to a next Ch. Whether or not there is a bit error in the phase-shifted clock in the area (2) is detected in a next frame.

Figure 5:
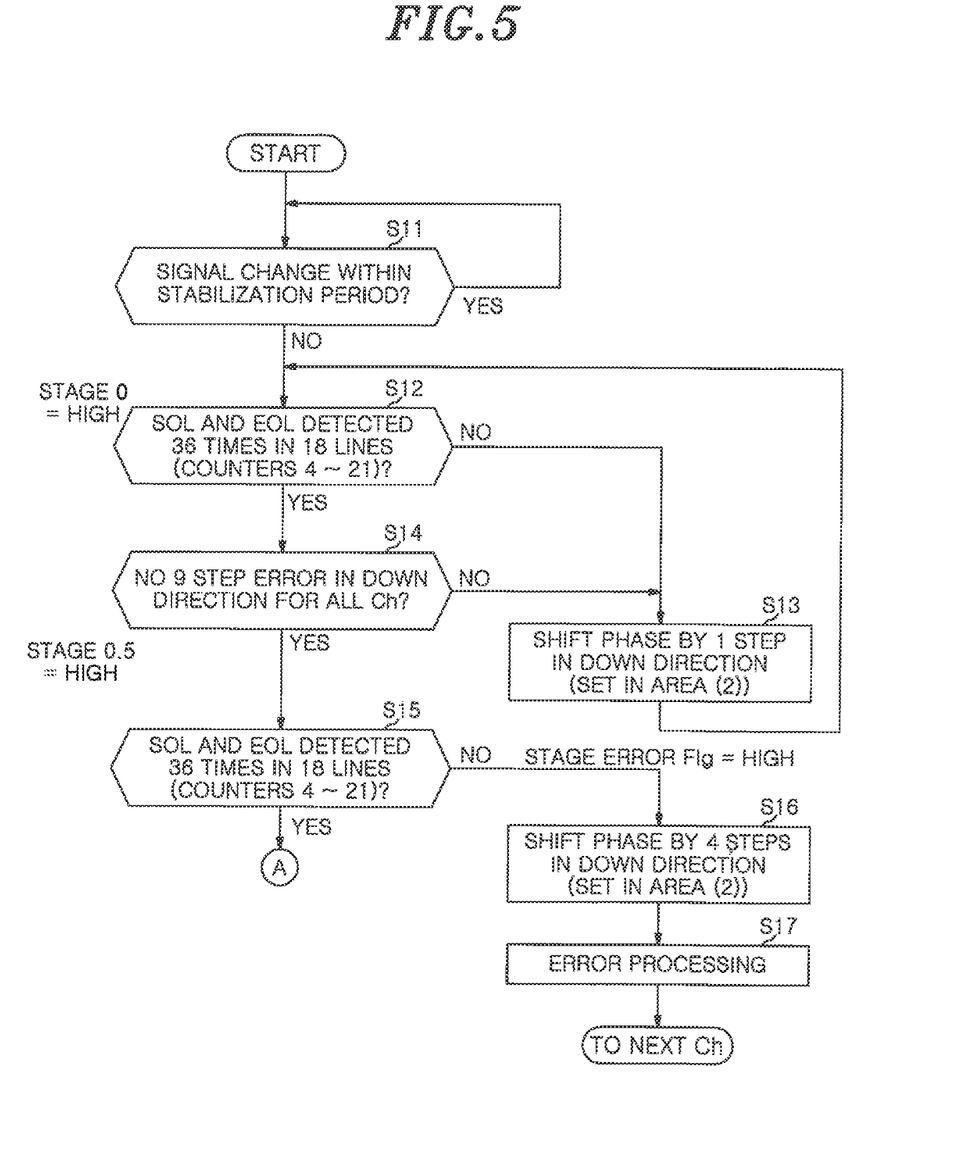
FIG. 5 is a flowchart showing a phase shift processing (1).
Figure 6:
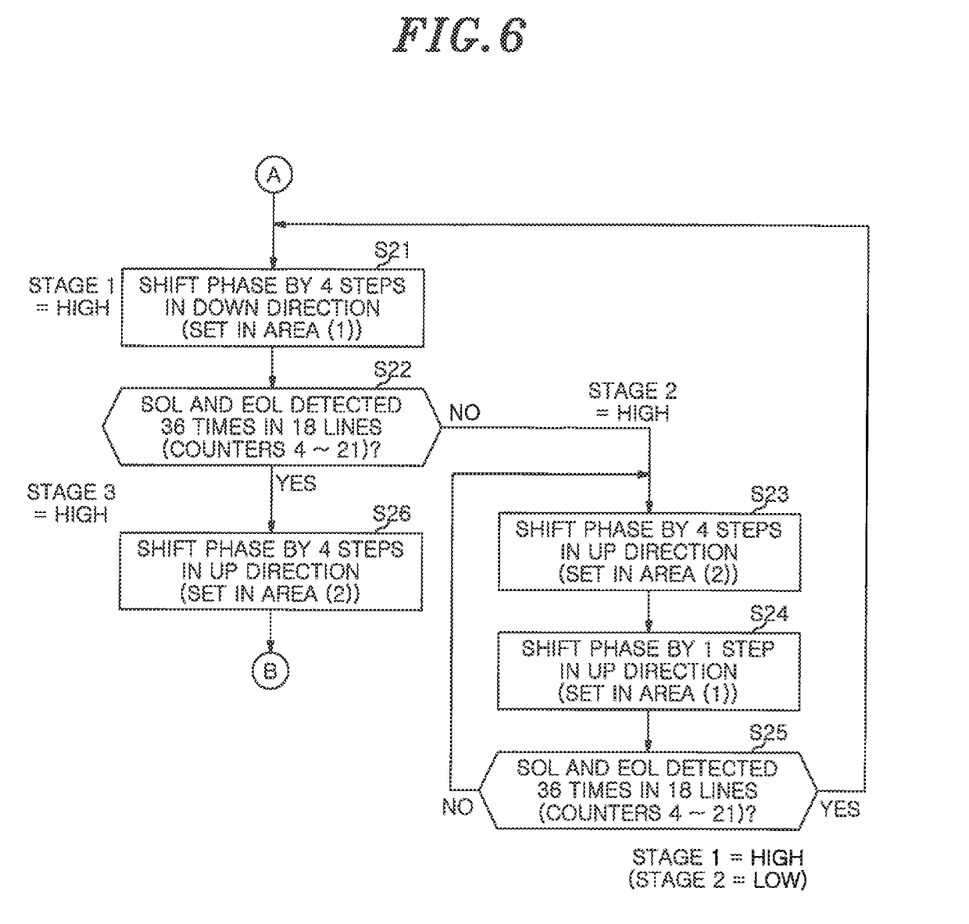
FIG. 6 is a flowchart showing a phase shift processing (2).
Figure 7:
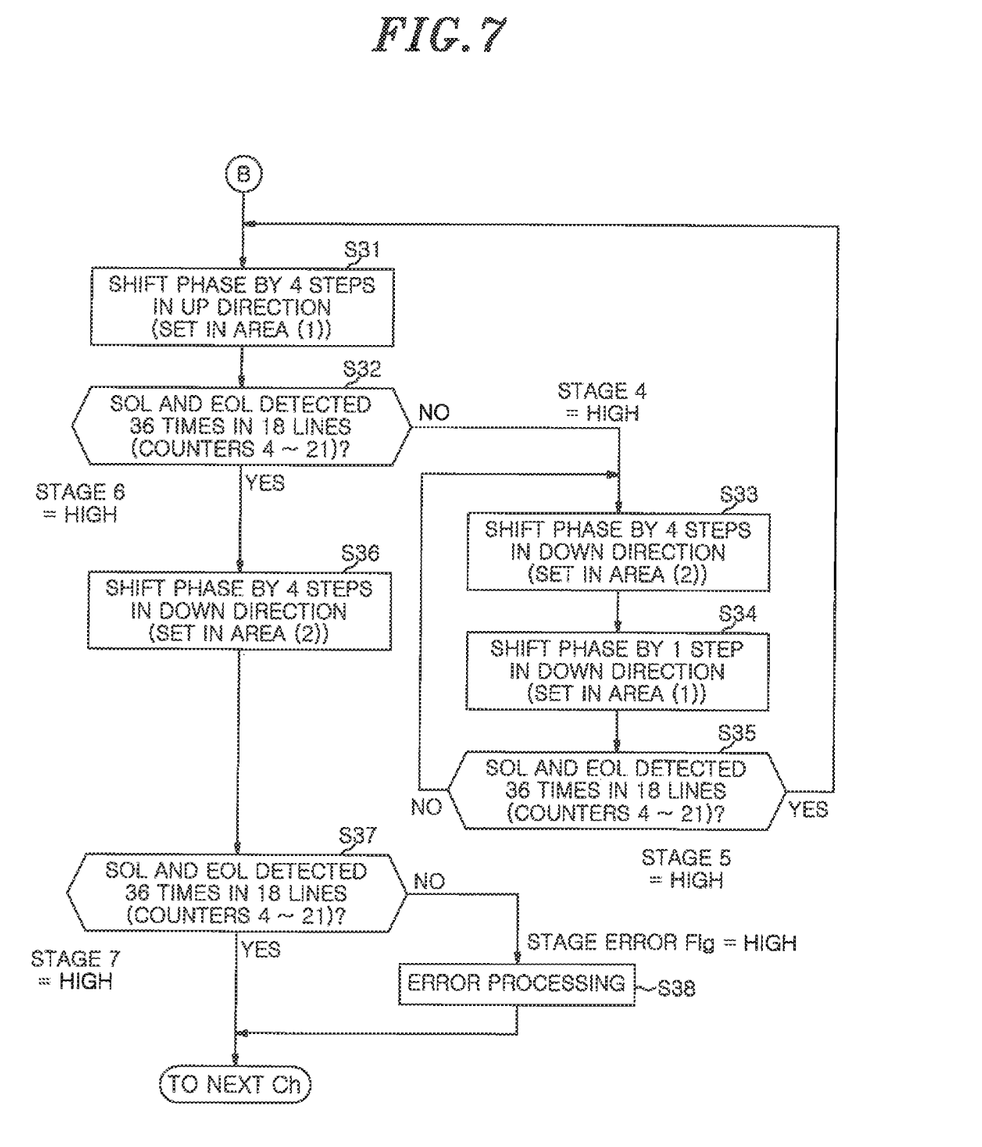
FIG. 7 is a flowchart showing a phase shift processing (3).

If SOL and EOL are detected 36 times (Yes), the processing proceeds to a process S21 of FIG. 6 through (A).

(Phase Shift Processing (2): FIG. 6)

After the determination process S15 of FIG. 5, the phase is shifted by 4 steps in the DOWN direction while setting the number of steps "4" in the area (1) (S21). Then, as shown in FIG. 6, it is determined whether or not SOL and EOL are detected 36 times in total in the 18 lines of the vertical counters 4 to 21 (S22).

If SOL and EOL are not detected 36 times (No), the phase is shifted by 4 steps in the UP direction while setting the number of steps in the area (2) (S23). Then, the phase is shifted by 1 step in the UP direction while setting the number of steps in the area (1) (S24).

Then, it is determined whether or not SOL and EOL are detected 36 times in total in the 18 lines of the vertical counters 4 to 21 (S25). If SOL and EOL are not detected 36 times (No), the processing returns to the process S23. If SOL and EOL are detected 36 times (Yes), the processing returns to the process S21.

When it is determined in the process S22 that SOL and EOL are detected 36 times (Yes), the phase is shifted by 4 steps in the UP direction while setting the number of steps in the area (2) (S26). Then, the processing proceeds to a process S31 of FIG. 7 through (B).

(Phase Shift Processing (3))

Next, in the processing control unit, the phase is shifted by 4 steps in the UP direction while setting the number of steps in the area (1) (S31) and, then, it is determined whether or not SOL and EOL are detected 36 times in the 18 lines of the vertical counters 4 to 21 (S32).

If SOL and EOL are not detected 36 times (No), the phase is shifted by 4 steps in the DOWN direction while setting the number of steps in the area (2) (S33). Then, the phase is shifted by 1 step in the DOWN direction while setting the number of steps in the area (1) (S34).

Next, it is determined whether or not SOL and EOL are detected 36 times in total in the 18 lines of the vertical counters 4 to 21 (S35). If SOL and EOL are not detected 36 times (No), the processing returns to the process 933. If SOL and EOL are detected 36 times (Yes), the processing returns to the process S31.

If it is determined in the process S32 that SOL and EOL are detected 36 times (Yes), the phase is shifted by 4 steps in the DOWN direction while setting the number of steps in the area (2) (S36).

Next, it is determined whether or not SOL and EOL are detected 36 times in total in the 18 lines of the vertical counters 4 to 21 (S37). If SOL and EOL are detected 36 times (Yes), the processing proceeds to a next Ch. If SOL and EOL are not detected 36 times (No), the error processing is performed (S38) and the processing proceeds to a next Ch. When the processing proceeds to a next Ch, the processing starts at STAGE 7, the number of steps for shifting in the areas (1) and (2) are reset, and the central clock phase in the optimal range is determined.

The phase shift processing of the present embodiment is performed for all Cha regularly and cyclically and can constantly deal with temperature changes.

Figure 8:
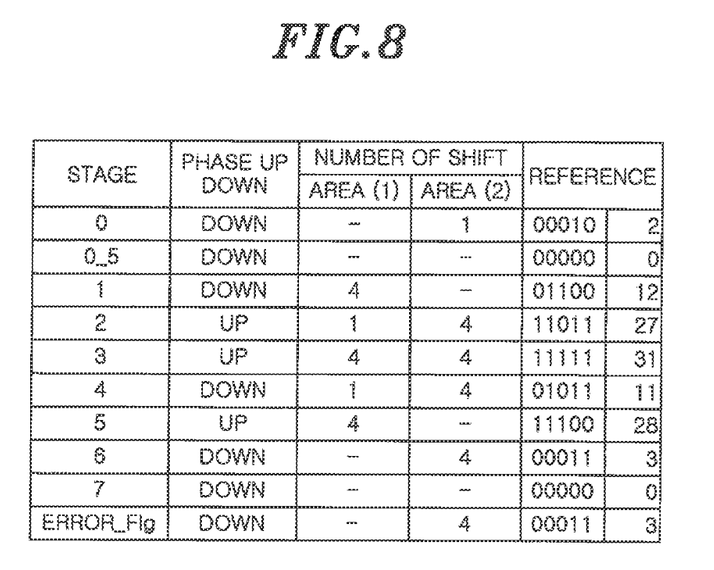
FIG. 8 shows a shift direction and the number of steps for each stage.
Figure 9:
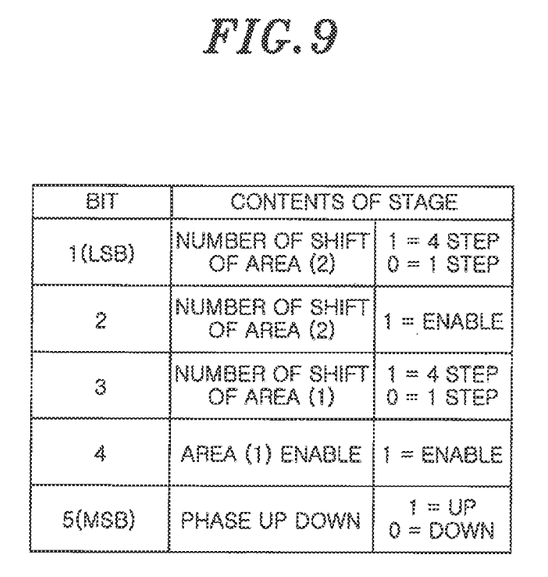
FIG. 9 shows contents of stage signals.

(Shift Direction and Number of Steps for Each Stage: FIG. 8/Contents of Stage Signal: FIG. 9)

Next, a shift direction and the number of steps for each stage, and contents of stage signal will be described with reference to FIGS. 8 and 9. FIG. 8 shows the shift direction and the number of steps for each stage. FIG. 9 shows contents of the stage signal.

The respective stages will be described in the flowchart of FIGS. 5 to 7.

FIG. 8 shows an UP direction and a DOWN direction of a phase (Phase up down), the number of shifts in the areas (1) and (2), and numerical values of phase control information (phase control signal/stage signal) for each stage. FIG. 9 shows the contents (meaning) of the numerical values (stage signal).

Particularly, the numerical values of bit 1 to 5 have the meaning described in FIG. 9.

Therefore, in STAGE 0, the number of shift in the DOWN direction is "1", so that the stage signal has a numerical value "00010". Since 5 bit (MSB) of the numerical value is "0", the shift direction is the DOWN direction. Since 4 bit is "0", the area (1) is disabled. Although 3 bit indicates the number of shift in the area (1), the area (1) is disabled and, thus, the number of shift is meaningless. Since 2 bit is "1", the area (2) is enabled. Since 1 bit (LSB) is "0", the number of shift is 1 step.

The numerical value of the stage signal is outputted from the R, B phase shift control unit 15 to the second PLL circuit 16 for each stage.

The second PLL circuit 16 is configured to shift the clock phase by reading the shift direction and the number of shift of the clock phase for each stage based on the numerical value of the stage signal.

It is determined that the clock phase is appropriately shifted when it is determined that no bit error occurs based on the count value obtained by the sol and eol detection/calculation circuit of the R, B phase shift control unit 15 as a result of the clock phase shift in the second PLL circuit 16.

Therefore, in the present embodiment, the clock phase is shifted for each frame by trial and error, and the occurrence of bit errors is prevented by appropriately shifting the clock phase depending on a low temperature, a room temperature, and a high temperature.

This drive substrate is suitable for a high-speed broadcast camera.

Effects of Embodiments

In accordance with the drive substrate, the clock phase is shifted in the first period within the blanking period during which the effective pixel data for each frame in the video signal is not used; the occurrence/non-occurrence of the bit error is detected based on the phase-shifted clock in the second period within the blanking period; the phase of the clock is shifted again in the third period within the blanking period; and the phase of the clock is appropriately adjusted by repeating these processes. Accordingly, it is possible to achieve reduction in a production cost and development time and to prevent occurrence of bit errors in video over a low to high temperature range.

INDUSTRIAL APPLICABILITY

The present invention is suitable for a drive substrate for a camera and a broadcast camera that are free from occurrence of bit errors in video over a low to high temperature range while achieving reduction in a production cost and development time.

This application claims priority to Japanese Patent Application No. 2018-170284, filed on Sep. 12, 2018, the entire contents of which are incorporated herein by reference.

DESCRIPTION OF REFERENCE NUMERALS 1, 1': drive substrate
10, 10': Drive-FPGA
11, 21: S/P conversion unit
12, 22: clock switching unit
13, 23: byte synchronization unit
14, 24: p/I conversion unit
15: R, B phase shift control unit
16: second PLL circuit
20: third PLL circuit
25: G phase shift control unit
26: first PLL circuit
31: counter circuit
32: comparator
100: sensor R substrate
151: sol detection circuit
152: eol detection circuit
153: OR circuit
154: sol and eol counter
200: sensor G substrate
300: sensor B substrate

The invention claimed is:

1. A drive substrate for a camera that receives video data from a sensor substrate and performs signal processing, comprising:
   a PLL circuit configured to shift a phase of a clock; and
   a phase shift control unit configured to control the PLL circuit to shift the phase of the clock in a first period within a blanking period during which effective pixel data of a frame in the video data is not used and to detect whether or not bit errors occur in the phase-shifted clock in a second period within the blanking period.

2. The drive substrate for a camera of claim 1, wherein when the bit errors occur in the second period, the phase shift control unit controls the PLL circuit to shift the phase of the clock in a third period within the blanking period and adjusts the phase of the clock by repeating the processes from the first period to the third period for each frame.

3. The drive substrate for a camera of claim 1, wherein the phase shift control unit counts a line start code and a line end code for multiple lines in the second period, and detects an occurrence of the bit errors when the count value is smaller than a predetermined set value.

4. A broadcast camera comprising:
   the drive substrate for the camera described in claim 1.

5. The drive substrate for a camera of claim 2, wherein the phase shift control unit counts a line start code and a line end code for multiple lines in the second period, and detects an occurrence of the bit errors when the count value is smaller than a predetermined set value.

6. A broadcast camera comprising:
   the drive substrate for the camera described in claim 2.

7. A broadcast camera comprising:
   the drive substrate for the camera described in claim 3.

8. A clock phase control method for a drive substrate for a camera, comprising:
   causing a PLL circuit to shift a phase of a clock in a first period within a blanking period during which effective pixel data of a frame in video data is not used;
   detecting whether or not bit errors occur in the phase-shifted clock in a second period within the blanking period;
   causing the PLL circuit to shift the phase of the clock in a third period within the blanking period when the bit errors occur in the second period; and
   adjusting the phase of the clock by repeating the processes from the first period to the third period for each frame.

* * * * *